United States Patent
Kamata

(10) Patent No.: US 11,051,360 B2
(45) Date of Patent: Jun. 29, 2021

(54) RADIO COMMUNICATION EQUIPMENT AND CONTROL METHOD THEREOF

(71) Applicant: KYOCERA Corporation, Kyoto (JP)

(72) Inventor: Tokiyasu Kamata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/543,407

(22) Filed: Aug. 16, 2019

(65) Prior Publication Data

US 2019/0373671 A1    Dec. 5, 2019

Related U.S. Application Data

(63) Continuation of application No. PCT/JP2018/005929, filed on Feb. 20, 2018.

(30) Foreign Application Priority Data

Feb. 21, 2017  (JP) .............................. JP2017-029734

(51) Int. Cl.
| | |
|---|---|
| *H04W 4/90* | (2018.01) |
| *H04W 76/50* | (2018.01) |
| *H04W 76/18* | (2018.01) |
| *H04W 60/04* | (2009.01) |
| *H04W 64/00* | (2009.01) |

(52) U.S. Cl.
CPC ............. *H04W 76/50* (2018.02); *H04W 4/90* (2018.02); *H04W 60/04* (2013.01); *H04W 64/003* (2013.01); *H04W 76/18* (2018.02)

(58) Field of Classification Search
CPC combination set(s) only.
See application file for complete search history.

(56) References Cited

U.S. PATENT DOCUMENTS

| | | | |
|---|---|---|---|
| 2008/0200142 A1* | 8/2008 | Abdel-Kader .... | H04M 1/72536 455/404.2 |
| 2010/0167737 A1* | 7/2010 | Madhavan ............ | H04W 48/20 455/435.2 |
| 2011/0028126 A1* | 2/2011 | Lim ...................... | H04W 12/06 455/411 |
| 2011/0171926 A1* | 7/2011 | Faccin .................. | H04W 48/18 455/404.1 |

(Continued)

FOREIGN PATENT DOCUMENTS

| | | |
|---|---|---|
| EP | 3 065 447 A1 | 9/2016 |
| JP | H05-102919 A | 4/1993 |

(Continued)

*Primary Examiner* — Steven S Kelley
(74) *Attorney, Agent, or Firm* — Studebaker & Brackett PC

(57) ABSTRACT

A radio communication equipment installed on a vehicle, comprises a radio communicator configured to perform radio communication with a network, and a controller configured to perform location registration and emergency call origination to a public safety answering point (PSAP) as an emergency call process via the network, in which the controller is configured to perform any one of termination of the emergency call process or continuation of the emergency call process, according to a failure cause value notified via the network, when at least one of the location registration and the emergency call origination is failed when the emergency call process is performed via the network in occurrence of an emergency situation.

6 Claims, 9 Drawing Sheets

(56) References Cited

U.S. PATENT DOCUMENTS

| | | | | |
|---|---|---|---|---|
| 2012/0088468 A1* | 4/2012 | Dickinson | ............... | H04W 4/90 |
| | | | | 455/404.2 |
| 2012/0289182 A1 | 11/2012 | Bourdu et al. | | |
| 2013/0303164 A1* | 11/2013 | Seo | ....................... | H04W 60/00 |
| | | | | 455/435.1 |
| 2019/0182789 A1* | 6/2019 | Kim | ........................ | H04W 8/08 |
| 2020/0029266 A1* | 1/2020 | Hata | ................. | H04W 36/0022 |

FOREIGN PATENT DOCUMENTS

| | | |
|---|---|---|
| JP | 2014-518042 A | 7/2014 |
| JP | 2015-082683 A | 4/2015 |
| JP | 2016-167264 A | 9/2016 |

* cited by examiner

RADIO COMMUNICATION EQUIPMENT AND CONTROL METHOD THEREOF

RELATED APPLICATIONS

The present application is a continuation based on PCT Application No. PCT/JP2018/005929, filed on Feb. 20, 2018, which claims the benefit of Japanese Patent Application No. 2017-029734 (filed on Feb. 21, 2017). The content of which is incorporated by reference herein in their entirety.

TECHNICAL FIELD

The present discloser relates to a radio communication equipment used in an emergency call system and a control method thereof.

BACKGROUND ART

Nowadays, an emergency call system for vehicles called ERA-GLONASS is implemented in Russia. In Europe, the implementation of an emergency call system for vehicles called eCall is scheduled in future. The vehicle emergency call system is a system that automatically makes a report to a nearest police department or fire department through an emergency call center in an emergency, such as a vehicular accident.

For more detailed description, in this emergency call system, a radio communication equipment for telematics installed on an automobile is used. For example, when an automobile encounters a traffic accident and any other accident, the radio communication equipment quickly makes a report to a public safety answering point (PSAP) including an emergency call center (e.g. see Patent Literature 1).

SUMMARY

A radio communication equipment for this application, which is installed on a vehicle, comprises a radio communicator configured to perform radio communication with a network, and a controller configured to perform location registration and emergency call origination to a public safety answering point (PSAP) as an emergency call process via the network, in which the controller is configured to perform any one of termination of the emergency call process or continuation of the emergency call process, according to a failure cause value notified via the network, when at least one of the location registration and the emergency call origination is failed when the emergency call process is performed via the network in occurrence of an emergency situation.

DESCRIPTION OF THE EMBODIMENT

The present discloser is to provide a radio communication equipment and a control method thereof that can appropriately deal with the case in which a vehicle emergency call system is not normally operated when the radio communication equipment originates to an emergency call center.

In the following, an embodiment will be described with reference to the drawings.

Figure 1:
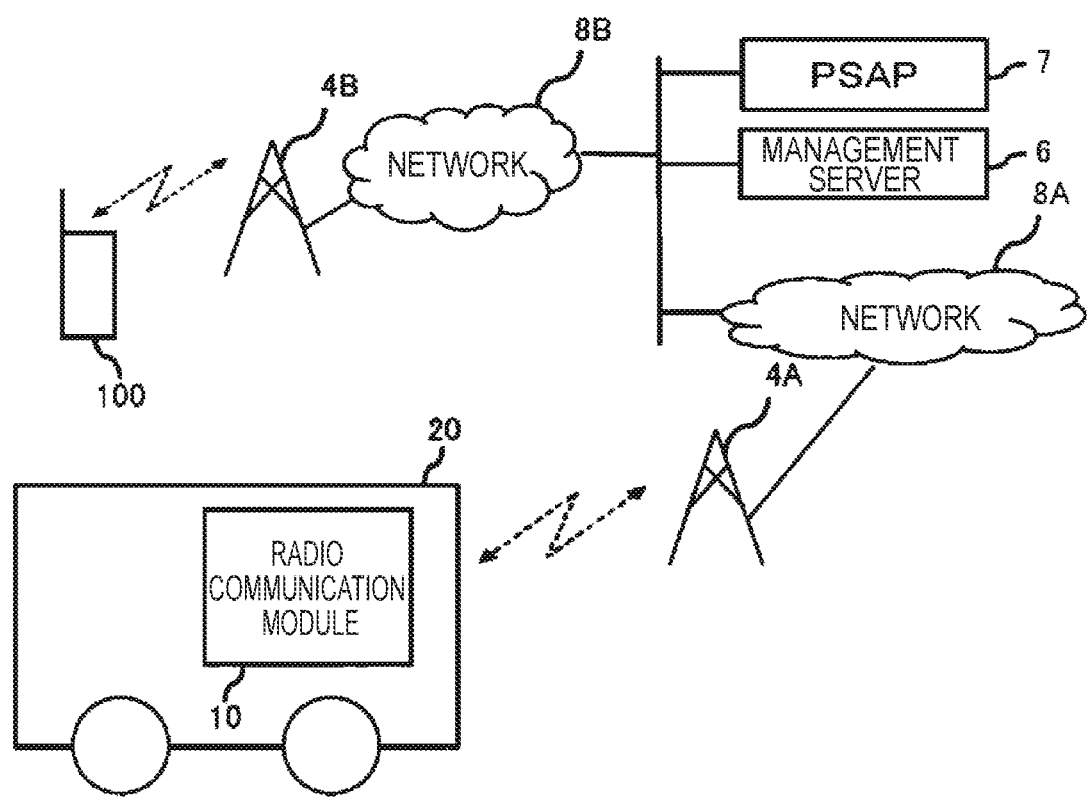
FIG. 1 is a block diagram of a radio communication system according to an embodiment.

FIG. 1 is a block diagram of a radio communication system according to an embodiment. The radio communication system illustrated in FIG. 1 has a vehicle 20 installed with a radio communication module 10, a base station 4A and a base station 4B, a network 8A and a network 8B, a radio terminal 100, a management server 6, and a PSAP 7.

The base station 4A, the base station 4B, the network 8A, and the network 8B are provided by a network operator A. Hereinafter, when the base station 4 or the network 8 is not distinguished for description, the base station 4 or the network 8 is simply described, whereas when the base station 4 or the network 8 is distinguished for description, the base stations 4A and 4B, or the networks 8A and 8B are described.

The base station 4 may cope with any mobile telecommunications systems, including second-generation mobile telecommunications systems, such as global system for mobile communications (GSM) (registered trademark), third-generation mobile telecommunications systems, such as code division multiple access (CDMA), or fourth-generation mobile telecommunications systems, such as long term evolution (LTE).

The radio communication module 10 implements various functions. For example, in the implementation of an emergency call system, the radio communication module 10 originates to the PSAP 7 (including an emergency call center) in an emergency. There are known telematics services that provide information services real time in combination of the vehicle 20 with a communication system. In the telematics services, map data and point of interest (POI) data for data updates of a navigation system from a server on the network 8. In the telematics services, diagnostic information on the equipments installed on the vehicle is uploaded to the server on the network 8. The radio communication module 10 performs such downloads and uploads via the network 8.

In the embodiment, the radio communication module 10 is instantiated as an in vehicle system (IVS) installed on a vehicle, such as the vehicle 20. In the embodiment, the vehicle 20 is described as an example of a vehicle. Note that the vehicle may be any moving transportation, such as ships or trains. The radio communication module 10 may be installed on portable terminals, such as cellular telephones or smartphones. The radio communication module 10 may be a module for internet of things (IoT).

The radio communication module 10 may cope with second-generation mobile telecommunications systems, third-generation mobile telecommunications systems, or fourth-generation mobile telecommunications systems. The radio communication module 10 may communicate with the radio terminal 100. The radio communication module 10 may have various functions and functions that execute programs created by a user.

The network operator A that manages the base station 4 or the network 8 provides network operator's mobile communications services to users that have concluded a contract with the network operator.

Figure 2:
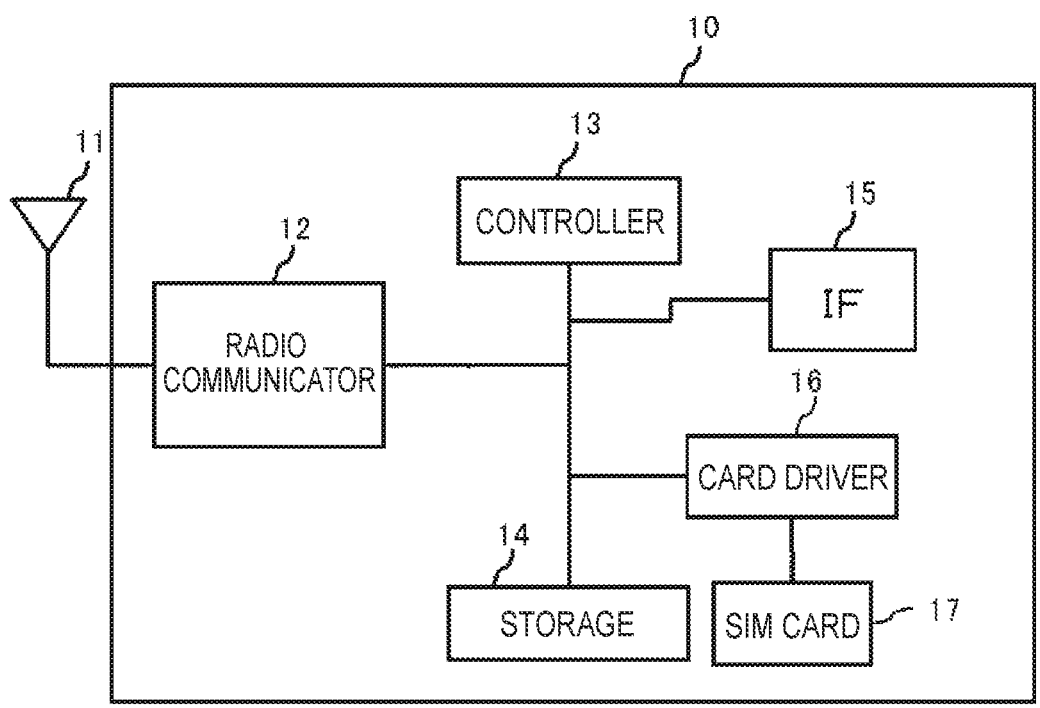
FIG. 2 is a block diagram of a radio communication module according to an embodiment.

FIG. 2 is a block diagram of the radio communication module according to the embodiment. The radio communication module illustrated in FIG. 2 has an antenna 11, a radio communicator 12, a controller 13, a storage 14, an IF 15, a card driver 16, and a subscriber identity module (SIM) card 17.

The antenna 11 transmits and receives radio signals with the base station 4.

The radio communicator 12 communicates with the base station 4 by radio communication through the antenna 11. The radio communicator 12 has an analog signal processor and a digital signal processor.

The analog signal processor performs amplification, an analog-to-digital conversion process, and any other process of radio signals received from the antenna 11, performs analog amplification, including a digital-to-analog conversion process, of the digital signals transferred from the digital signal processor, and transmits the analog signals through the antenna 11.

The digital signal processor encodes data transferred from the controller 13, and converts the data into digital signals such that the data can be transmitted through the communication channel of radio signals, whereas the digital signal processor decodes the digital signals transferred from the analog signal processor, and transfers the decoded data to the controller 13.

The controller 13 is mainly configured of a microcomputer formed of a central processing unit (CPU) that executes various programs, a read only memory (ROM), a random access memory (RAM), a backup RAM, an input/output (I/O), and any other component (none of them are illustrated in the drawings), and executes various control programs stored on the ROM to execute various processes. The controller 13 executes processes necessary to control the radio communicator 12.

The storage 14 is configured of an electronically erasable and programmable read only memory (EEPROM) that can electrically rewrite the content, for example, and the storage 14 stores programs and information necessary to control the radio communicator 12.

The IF 15 is a universal serial bus IF and any other IF, and is connected to a display, a microphone, and a speaker, or a navigation system, for example.

The card driver 16 drives an IC card referred to as a SIM card (or a UIM card), i.e., an information card. The card driver 16 may accept and reject the SIM card 17. In the case in which the card driver 16 is instructed to read or write configuration information by the controller 13, the card driver 16 reads configuration information recorded on the SIM card 17, and writes configuration information on the SIM card 17.

Generally, the SIM card is an IC card recording information that identifies a subscriber, network operator identification information that identifies a network operator, and information on services usable by the subscriber in contract, and any other information.

The SIM card 17 may be an embedded eSIM (embedded SIM). The SIM card 17 may be disposed on the outside of the radio communication module 10. The SIM card 17 may be supplied by the network operator, or may be obtained through other means. The user mounts or connects the supplied SIM card 17 to the radio communication module 10 to use the radio communication module 10.

The SIM card records configuration information necessary to receive services. For example, there are various pieces of configuration information, such as information in the registration of location information and information on a telephone number (e.g. an IVS telephone number). These pieces of information are transmitted to the management server 6 on the network 8.

In the following, the operation of the radio communication system according to the embodiment will be described.

In the radio communication system according to the embodiment, the emergency call system eCall is described. A part of the specification of eCall is prescribed in TS 24.008 (Core Network Protocol; Stage3) of the third generation partnership project (3GPP). The controller 13 makes location registration and emergency call origination as an emergency call process via the network.

The SIM card 17 has a type that accepts only eCall services and a type that accepts telematics services (data communication and telephones) and eCall. The embodiment describes a type that accepts only eCall services. However, the embodiment is applicable to other types.

Figure 3:
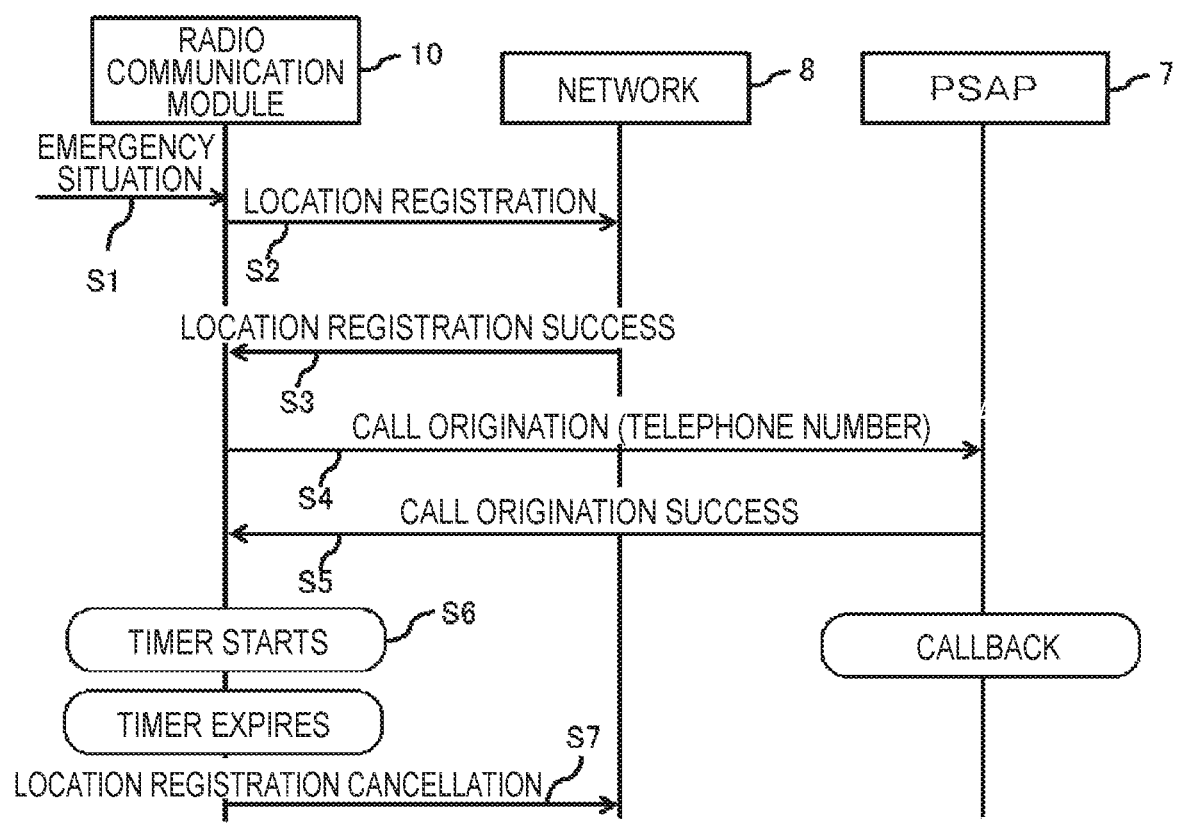
FIG. 3 is a sequence diagram illustrating the operation of the radio communication system according to an embodiment.

FIG. 3 is a sequence diagram illustrating the operation of the radio communication system according to the embodiment.

First, an emergency situation occurs and an emergency situation event is notified to the radio communication module 10 (Step S1). The emergency situation is a traffic accident or an accident or injury, for example, to a user who uses the radio communication module 10. However, the emergency situation is not limited to a specific accident or injury. An emergency situation event may be automatically generated by a sensor installed on the vehicle 20 sensing an emergency situation, or an emergency situation event may be manually generated by a user who senses an emergency situation. Note that before an emergency situation event occurs, the communication state of the radio communication module 10 is the mode in which an emergency call (emergency call inactive operation: eCall Inactivity) is not originated (in the following, referred to as emergency call origination).

Upon receiving this notification, the controller 13 performs location registration to the location registration management server 6 on the network 8 through the base station 4 (Step S2). The radio communication module 10 is notified that location registration is successful (Step S3).

The controller 13 makes an emergency call to the PSAP 7 (Step S4). At this time, since the location registration of the radio communication module 10 is successful, the PSAP 7 can know the telephone number of the radio communication module 10. The radio communication module 10 receives a notification that emergency call origination is successful (Step S5), and the controller 13 activates a timer T after emergency call origination (Step S6). If emergency call origination is successful, a driver or another passenger on the vehicle 20 can talk to an operator at the PSAP 7. If location information on the vehicle 20 is notified together with emergency call origination, the operator at the PSAP 7 can know the location of the vehicle 20.

The controller 13 maintains the location registration during the period of the timer T without cancellation. During a predetermined time period (e.g. 12 hours) from the time point at which the timer T is activated, communication with the PSAP 7 is enabled. The timer T expires after a predetermined time period. At the expiration, the controller 13 goes to the emergency call inactive operation (eCall Inactivity) mode, and cancels the location registration (Step S7). In the emergency call inactive operation (eCall Inactivity) mode, the radio communication module 10 does not consume electric power much.

Supposing that instead of Step S3, in a case of failure in location registration and no failure in emergency call origination, location registration is repeatedly tried during the period of the timer T. However, in order to reduce the power consumption of the radio communication module 10, the controller 13 may terminate the emergency call process and go to the emergency call inactive operation (eCall Inactivity) mode when location registration is unsuccessful.

If the PSAP 7 knows the telephone number of the radio communication module 10, the operator at the PSAP 7 can make a callback to the vehicle 20 in the emergency situation. When the operator at the PSAP 7 talks to the driver or another passenger on the vehicle 20 and this tells the telephone number to the operator, the operator can make a callback to the vehicle 20 in the emergency situation.

Figure 4:
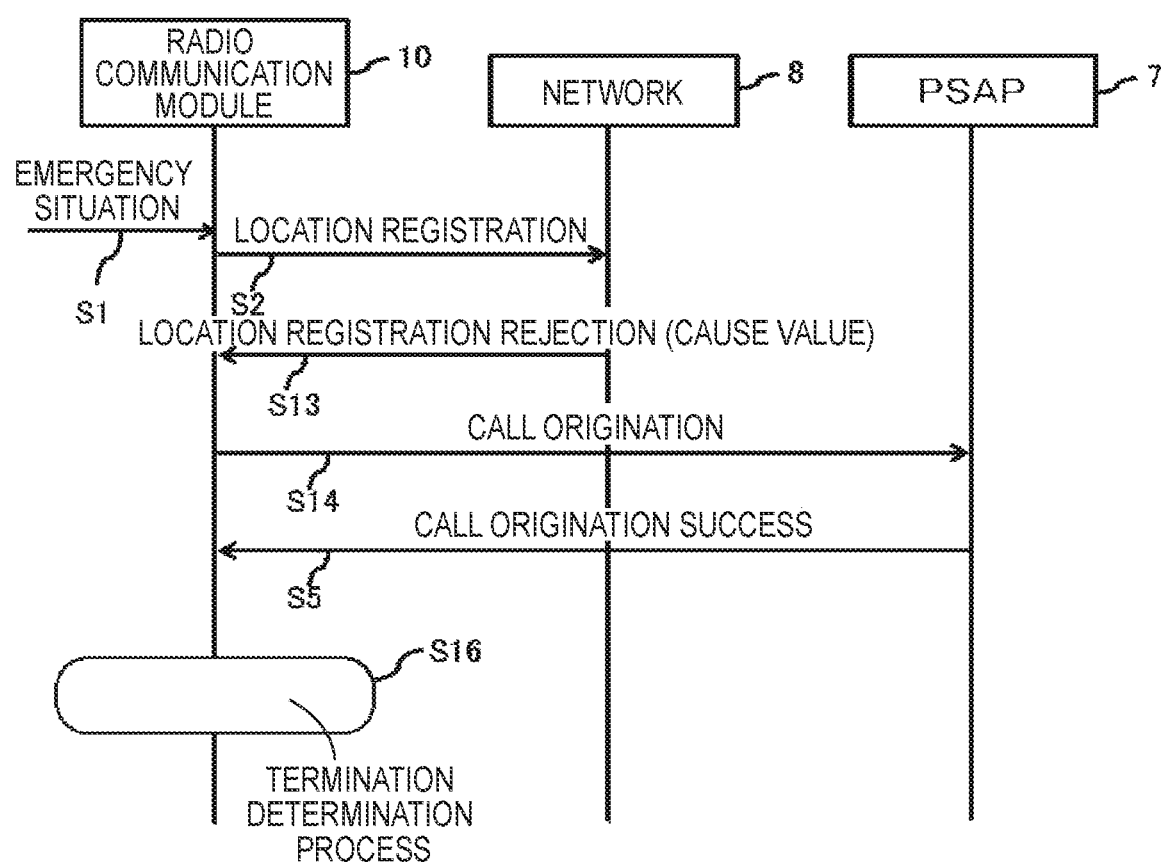
FIG. 4 is a sequence diagram illustrating the operation of the radio communication system when location registration is rejected.

FIG. 4 is a sequence diagram illustrating the operation of the radio communication system when location registration is rejected.

First, the operations in Steps S1 and S2 are the same as the operations described in FIG. 3. When location registration is rejected, the radio communication module 10 receives a notification that the location registration is rejected via the network 8 (Step S13). The controller 13 can know the cause value from the notification when location registration is rejected.

The controller 13 then makes an emergency call to the PSAP 7 (Step S14). At this time, since the radio communication module 10 is unsuccessful in the location registration, the telephone number of the radio communication module 10 is not notified to the PSAP 7. Under the situations, the operator at the PSAP 7 is not possible to make a callback to the vehicle 20 in the emergency situation. The radio communication module 10 receives a notification that emergency call origination is successful (Step S5), and executes the termination determination process of the emergency call process (Step S16).

Figure 5:
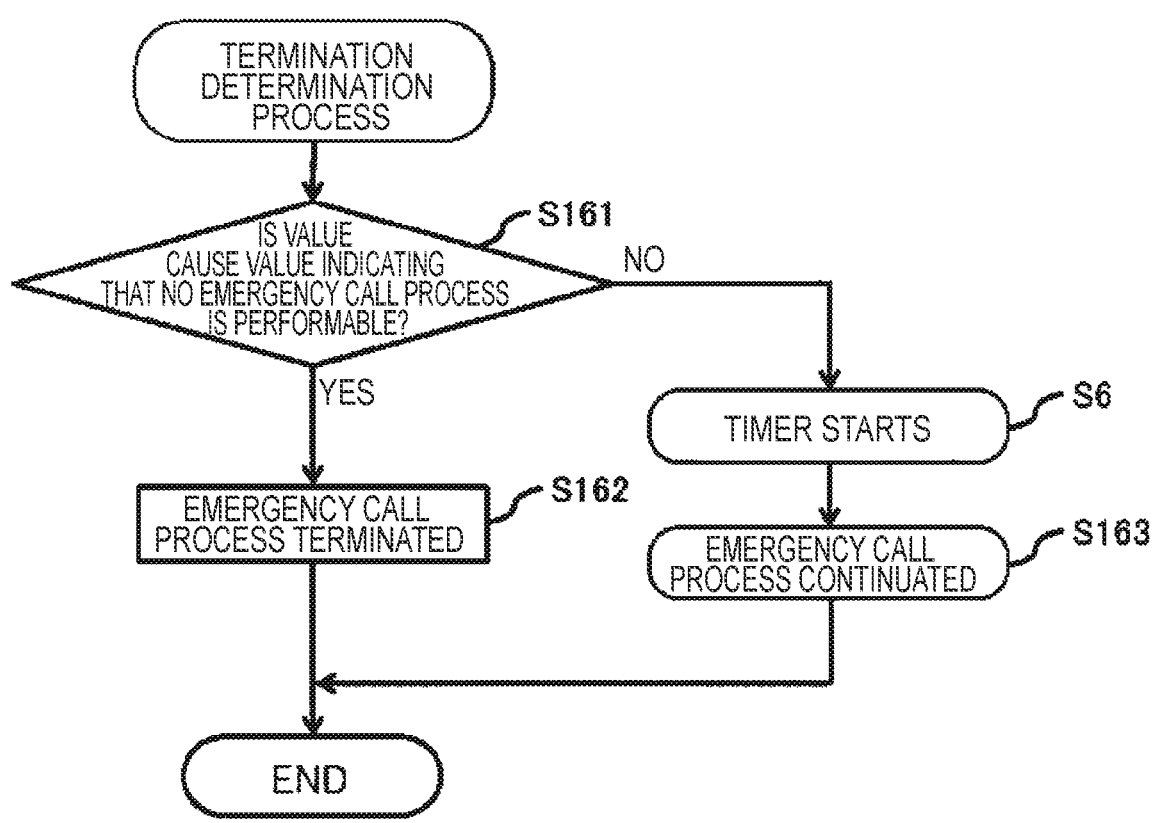
FIG. 5 is a flowchart illustrating the termination determination process of an emergency call process when location registration is rejected in the radio communication module.

FIG. 5 is a flowchart illustrating the termination determination process of the emergency call process when location registration is rejected in the radio communication module 10.

First, the controller 13 of the radio communication module 10 makes reference to a cause value when location registration is rejected, and determines whether to terminate the emergency call process based on the cause value (Step S161). The cause values described in the embodiment are cause values prescribed in the 3GPP.

For example, as the value in a case of expectation that no emergency call process is performable, the cause value may have a value "2", for example, when a failure occurs due to the factor of the terminal or the factor of the SIM card (IMSI unknown in HLR), whereas as the value in a case of expectation that the emergency call process is performable, the cause value may have a value "17", for example, when a failure occurs due to a temporary factor of the network (Network Failure).

In the case in which the location registration is rejected, as the value in the case of expectation that no emergency call process is performable, the value may be the value in the case of expectation that no location registration is performable, whereas as the value in the case of expectation that the emergency call process is performable, the value may be the value in the case of expectation that location registration is performable.

When the cause value is the value in the case of expectation that no emergency call process is performable, the controller 13 terminates the emergency call process (Step S162), and goes to the emergency call inactive operation (eCall Inactivity) mode.

When the cause value is the value in the case of expectation that the emergency call process is performable, the controller 13 activates the timer T after emergency call origination (Step S6), and the controller 13 repeatedly tries location registration during the period of the timer T to continue the emergency call process (Step S163). The process expires after a predetermined time period (e.g. 12 hours, or a short time period may be fine) from the time point at which the timer T is activated, and in the expiration, the controller 13 goes to the emergency call inactive operation (eCall Inactivity) mode.

As described in FIGS. 4 and 5, even failure in the location registration, after that, in the case of expectation that the emergency call process is performable, the radio communication module 10 can retry communication with the PSAP 7. In the case in which the operator can acquire the telephone number, such as the case in which the radio communication module 10 is connected to the PSAP 7 and the user of the radio communication module 10 tells the operator at the PSAP 7 the telephone number, the operator can make a callback to the vehicle 20 in the emergency situation.

In the case of failure in location registration and in the case of expectation that no emergency call process is performable, the radio communication module 10 terminates the emergency call process, and goes to the emergency call inactive operation (eCall Inactivity) mode. Thus, the power consumption of the radio communication module 10 can be reduced as well as a load to the network can be deterred.

Figure 6:
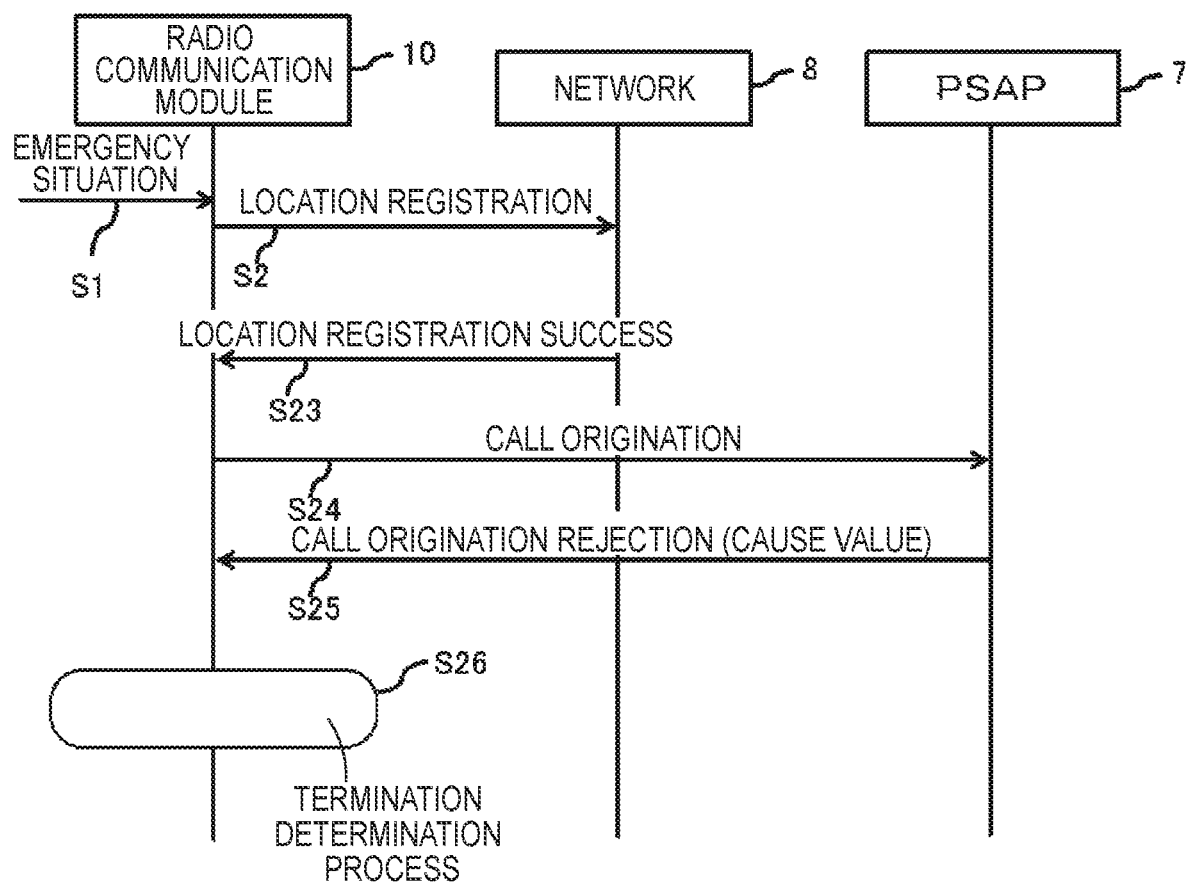
FIG. 6 is a sequence diagram illustrating the operation of the radio communication system when emergency call origination is rejected.

FIG. 6 is a sequence diagram illustrating the operation of the radio communication system when emergency call origination is rejected.

First, the operations in Steps S1 and S2 are the same as the operations described in FIG. 3. The radio communication module 10 is notified that location registration is successful (Step S23).

After the location registration is successful, the controller 13 makes an emergency call to the PSAP 7 (Step S24). Here, when emergency call origination is rejected, the radio communication module 10 receives a notification, via the network 8, that emergency call origination is rejected (Step S25). The controller 13 can know the cause value when emergency call origination is rejected from the notification. After that, the radio communication module 10 executes the termination determination process of the emergency call process (Step S26).

Figure 7:
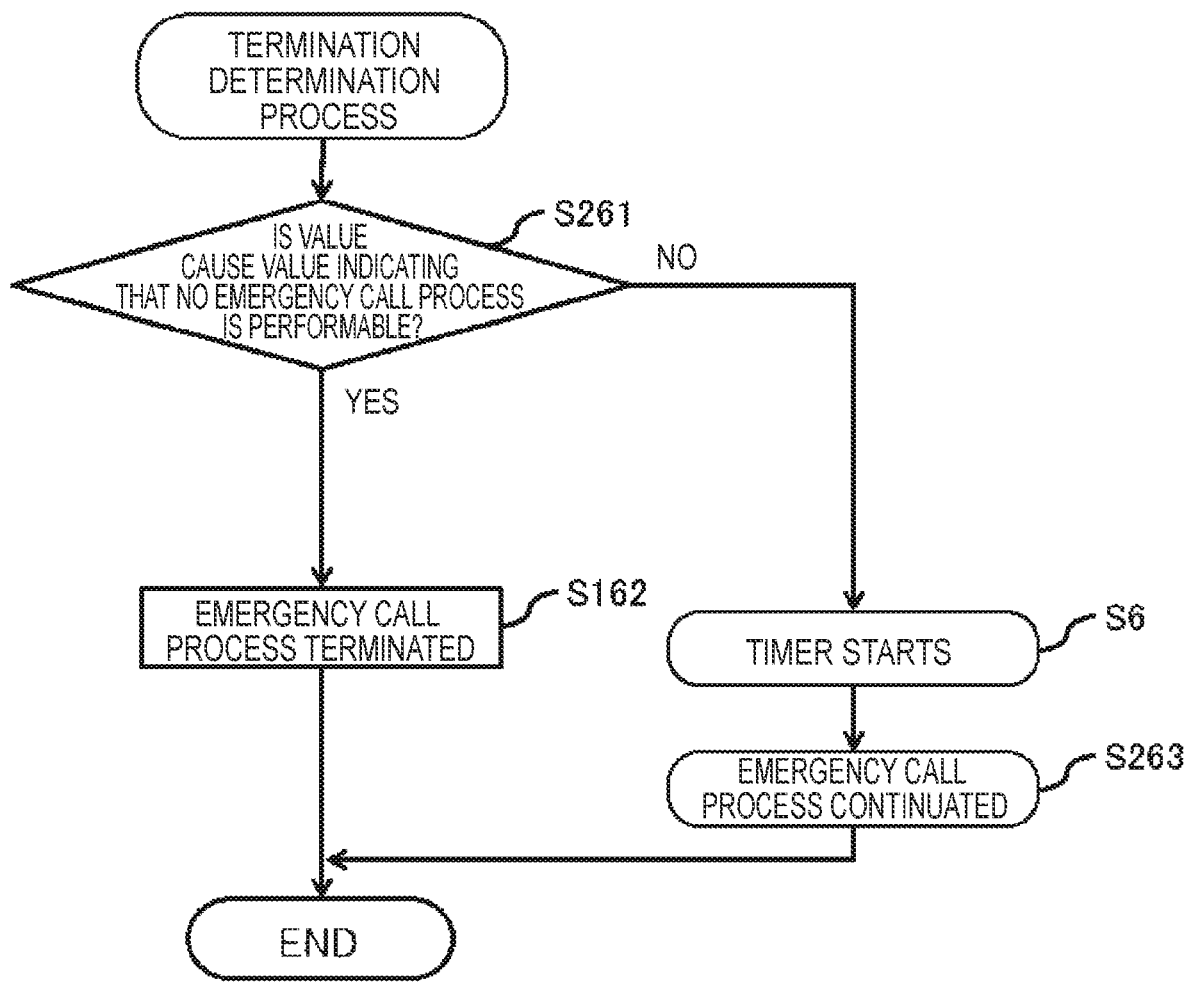
FIG. 7 is a flowchart illustrating the termination determination process of the emergency call process when emergency call origination is rejected in the radio communication module.

FIG. 7 is a flowchart illustrating the termination determination process of the emergency call process when emergency call origination is rejected in the radio communication module 10.

First, the controller 13 of the radio communication module 10 makes reference to a cause value when emergency call origination is rejected, and determines whether or not to terminate the emergency call process based on the cause value (Step S261).

For example, as the value in the case of expectation that no emergency call process is performable, the cause value may be the value "2" when a failure occurs due to the factor of the terminal or the factor of the SIM card (IMSI unknown in HLR) and a value "33", for example, in the case of failure in the emergency call process because no telephone number is notified to the PSAP 7 even though the location registration is successful (Request Service Option not subscribed), whereas as the value in the case of expectation that the emergency call process is performable, the cause value may be the value "17", for example, when a failure occurs due to a temporary factor of the network (Network Failure).

In the case in which emergency call origination is rejected, as the value in the case of expectation that no emergency call process is performable, the value may be the value in the case of expectation that no emergency call origination is performable, whereas as the value in the case of expectation that the emergency call process is performable, the value may be the value in the case of expectation that emergency call origination is performable.

When the cause value is the value in the case of expectation that no emergency call process is performable, the controller 13 terminates the emergency call process (Step S162), and goes to the emergency call inactive operation (eCall Inactivity) mode.

When the cause value is the value in the case of expectation that the emergency call process is performable, the controller 13 activates the timer T after emergency call origination (Step S6), and the controller 13 maintains the location registration during the period of the timer T to continue the emergency call process (Step S263). The process expires after a predetermined time period (e.g. 12 hours) from the time point at which the timer T is activated, and in the expiration, the controller 13 goes to the emergency call inactive operation (eCall Inactivity) mode.

As described in FIGS. 6 and 7, even failure in emergency call origination, after that, in the case of expectation that the emergency call process is performable, the radio communication module 10 can retry communication with the PSAP 7. In the case of failure in emergency call origination and in the case of expectation that no emergency call process is performable, the radio communication module 10 terminates the emergency call process, and goes to the emergency call inactive operation (eCall Inactivity) mode. Thus, the power consumption of the radio communication module 10 can be reduced as well as a load to the network can be deterred.

Figure 8:
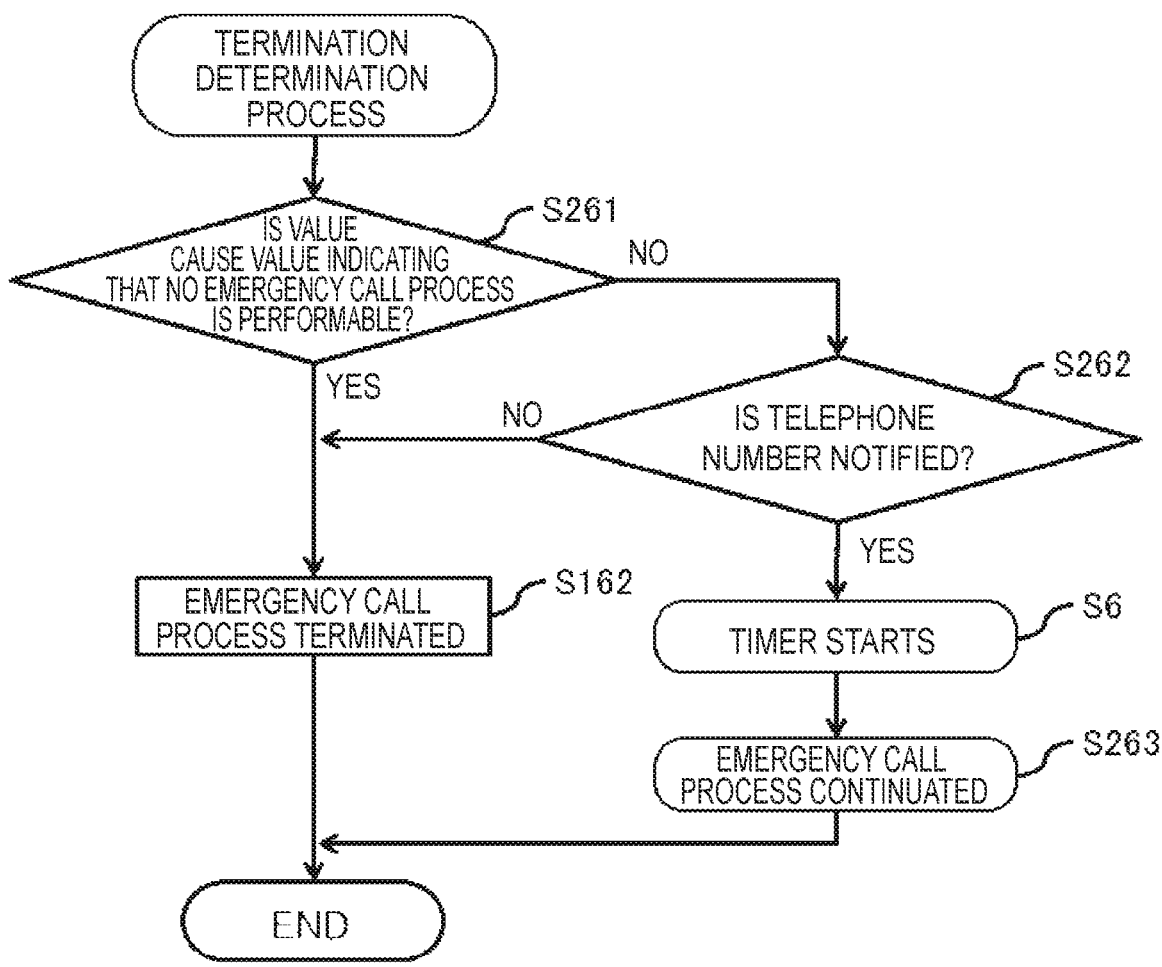
FIG. 8 is a flowchart illustrating the termination determination process of the emergency call process when emergency call origination is rejected in the radio communication module.

FIG. 8 is a flowchart illustrating the termination determination process of the emergency call process when emergency call origination is rejected in the radio communication module 10.

First, the controller 13 of the radio communication module 10 makes reference to a cause value when emergency call origination is rejected, and determines whether or not to terminate the emergency call process based on the cause value (Step S261).

When the cause value is the value in the case of expectation that no emergency call process is performable, the controller 13 terminates the emergency call process (Step S162), and goes to the emergency call inactive operation (eCall Inactivity) mode.

When the cause value is the value in the case of expectation that the emergency call process is performable, the controller 13 determines whether or not a telephone number has been notified to the PSAP 7 based on the above-described cause value (Step S262).

In the case in which no telephone number is notified to the PSAP 7, the controller 13 terminates the emergency call process (Step S162), whereas in the case in which a telephone number has been notified, the controller 13 activates the timer T after emergency call origination (Step S6), and maintains the location registration during the period of the timer T to continue the emergency call process (Step S263). The process expires after a predetermined time period (e.g. 12 hours) from the time point at which the timer T is activated, and in the expiration, the controller 13 goes to the emergency call inactive operation (eCall Inactivity) mode.

As described in FIGS. 6 and 8, even failure in emergency call origination, after that, in the case in which expectation is that the emergency call process is performable and a telephone number has been notified, the radio communication module 10 can retry communication with the PSAP 7. In this case, the operator can make a callback to the vehicle 20 in the emergency situation.

In the case of failure in emergency call origination and in the case of expectation that no emergency call process is performable, the radio communication module 10 terminates the emergency call process, and goes to the emergency call inactive operation (eCall Inactivity) mode. Thus, the power consumption of the radio communication module 10 can be reduced as well as a load to the network can be deterred.

Figure 9:
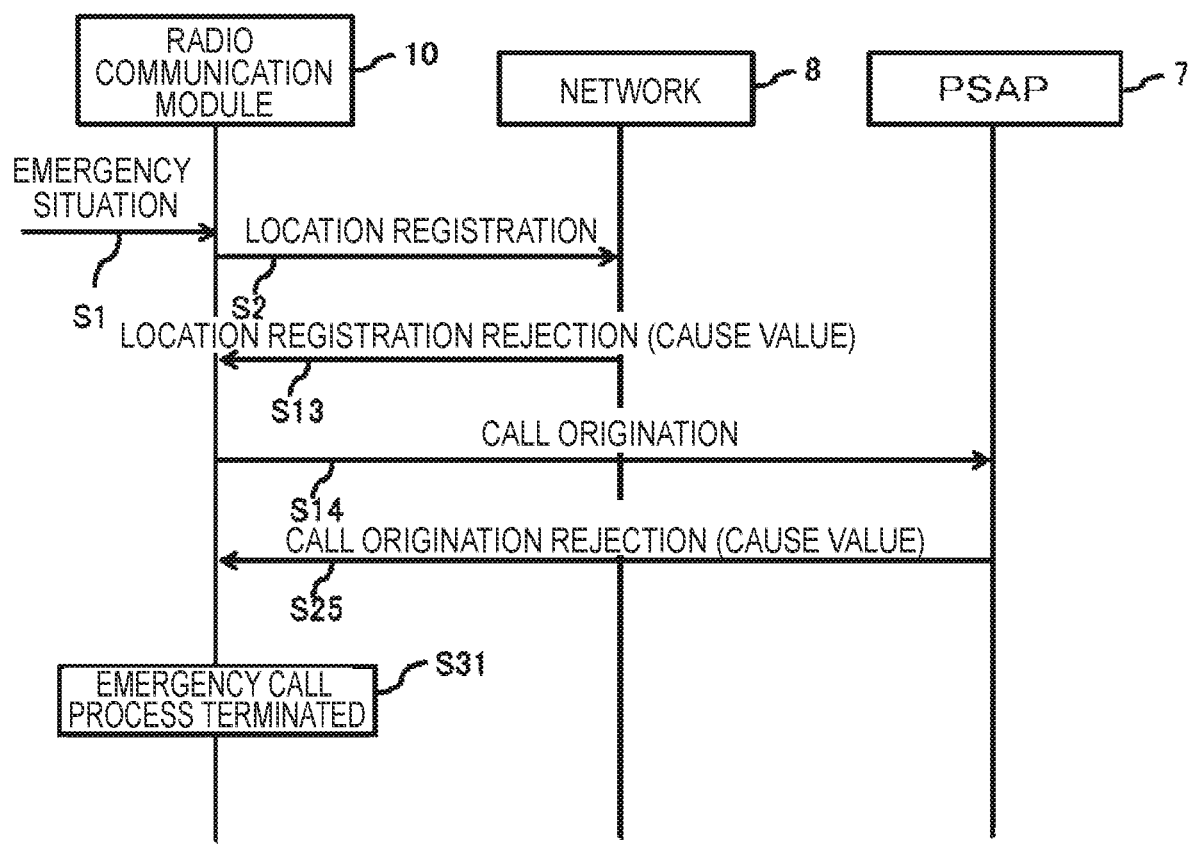
FIG. 9 is a sequence diagram illustrating the operation of the radio communication system when both of location registration and emergency call origination are rejected.

FIG. 9 is a sequence diagram illustrating the operation of the radio communication system when both of location registration and emergency call origination are rejected.

First, the operations in Steps S1, S2, S13, and S14 are the same as the operations described in FIG. 3. When emergency call origination is rejected by the PSAP 7, the radio communication module 10 receives a notification, via the network 8, that emergency call origination is rejected (Step S25).

When both of location registration and emergency call origination are rejected, expectation is that no emergency call process is performable. Thus, the controller 13 terminates the emergency call process (Step S31), and goes to the emergency call inactive operation (eCall Inactivity) mode.

As described in FIG. 9, in the case of failure in both of location registration and emergency call origination, the radio communication module 10 has expectation that no emergency call process is performable. Thus, the power consumption of the radio communication module 10 can be reduced as well as a load to the network can be deterred.

INDUSTRIAL APPLICABILITY

The present discloser can provide a radio communication equipment and a control method thereof that can appropriately deal with the case of failure in location registration or emergency call origination to a PSAP via a network when the radio communication equipment originates to the PSAP.

The invention claimed is:

1. A radio communication equipment installed on a vehicle, comprising:
   a radio communicator configured to perform radio communication with a network; and
   a controller configured to perform location registration and emergency call origination to a public safety answering point (PSAP) as an emergency call process via the network, wherein
   the controller is configured to,
      determine that the emergency call origination has failed;

perform any one of termination of the emergency call process or continuation of the emergency call process, according to a failure cause value notified via the network, when at least one of the location registration and the emergency call origination is failed when the emergency call process is performed via the network in occurrence of an emergency situation;

receive, as the failure cause value of the emergency call origination, a first failure cause value indicating that a telephone number of the radio communication equipment is not notified to the PSAP even when the location registration is successful;

terminate the emergency call process in response to receiving the first failure cause value;

receive, as the failure cause value of the emergency call origination, a second failure cause value indicating that the telephone number of the radio communication equipment is notified to the PSAP when the location registration is successful; and retry the emergency call in response to receiving the second failure cause value.

2. The radio communication equipment according to claim 1, wherein when the location registration is failed, the controller is configured to terminate the emergency call process when the failure cause value is a value indicating a case of expectation that no location registration is performable, and when the location registration is failed, the controller is configured to try the location registration when the failure cause value is a value indicating a case of expectation that location registration is performable.

3. The radio communication equipment according to claim 1, wherein when the emergency call origination is failed, the controller is configured to terminate the emergency call process when the failure cause value is a value indicating a case of expectation that no emergency call origination is performable.

4. A vehicle on which the radio communication equipment according to claim 1 is installed.

5. The radio communication equipment according to claim 1, wherein the controller is configured to, start a timer in response to receiving the second failure cause value;

continue the emergency call process during running the timer; and terminate the emergency call process in response to the timer expired.

6. A control method for a radio communication equipment installed on a vehicle, the radio communication equipment comprising:

a radio communicator configured to perform radio communication with a network, and a controller configured to perform location registration and emergency call origination to a public safety answering point (PSAP) as an emergency call process via the network, the control method for the radio communication equipment, comprising determining that the emergency call origination has failed;

performing any one of termination of the emergency call process or continuation of the emergency call process, according to a failure cause value notified via the network, when at least one of the location registration and the emergency call origination is failed when the emergency call process is performed via the network in occurrence of an emergency situation;

receiving, as the failure cause value of the emergency call origination, a first failure cause value indicating that a telephone number of the radio communication equipment is not notified to the PSAP even when the location registration is successful;

terminating the emergency call process in response to receiving the first failure cause value;

receiving, as the failure cause value of the emergency call origination, a second failure cause value indicating that the telephone number of the radio communication equipment is notified to the PSAP when the location registration is successful; and retrying the emergency call in response to receiving the second failure cause value.

* * * * *